(12) United States Patent
Davidson et al.

(10) Patent No.: US 8,856,400 B1
(45) Date of Patent: Oct. 7, 2014

(54) I/O PERFORMANCE QUOTAS

(71) Applicant: EMC Corporation, Hopkinton, MA (US)

(72) Inventors: James L. Davidson, Tyngsboro, MA (US); Chris Bunting, Carindale (AU); Arieh Don, Newton, MA (US); Patrick Brian Riordan, West Newton, MA (US); John F. Madden, Jr., Holden, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/833,692

(22) Filed: Mar. 15, 2013

(51) Int. Cl.
| G06F 3/00 | (2006.01) |
| G06F 5/00 | (2006.01) |
| G06F 13/12 | (2006.01) |
| G06F 13/38 | (2006.01) |
| G06F 17/30 | (2006.01) |
| H04M 15/02 | (2006.01) |

(52) U.S. Cl.
CPC ......... G06F 17/30082 (2013.01); H04M 15/02 (2013.01)
USPC ........ 710/34; 710/6; 710/17; 710/18; 710/36; 710/56

(58) Field of Classification Search
CPC ..... G06F 17/00; G06F 17/30082; G06F 9/46; G06F 9/468; H04M 15/02; H04M 15/42; H04L 12/08; H04L 12/26; H04Q 7/00
USPC ...................................... 710/6, 17, 18, 36, 34
See application file for complete search history.

(56) References Cited

U.S. PATENT DOCUMENTS

| 5,206,939 | A | 4/1993 | Yanai et al. |
| 5,742,792 | A | 4/1998 | Yanai et al. |
| 5,778,394 | A | 7/1998 | Galtzur et al. |
| 5,845,147 | A | 12/1998 | Vishlitzky et al. |
| 5,857,208 | A | 1/1999 | Ofek |
| 7,054,883 | B2 | 5/2006 | Meiri et al. |
| 7,665,090 | B1 * | 2/2010 | Tormasov et al. ............ 718/104 |
| 8,291,490 | B1 | 10/2012 | Ahmed et al. |
| 8,429,096 | B1 * | 4/2013 | Soundararajan et al. ....... 706/12 |
| 8,612,990 | B1 * | 12/2013 | Greenfield et al. ........... 718/105 |
| 2006/0041587 | A1 * | 2/2006 | Grubbs et al. ............ 707/104.1 |
| 2007/0133415 | A1 * | 6/2007 | Spink ............................ 370/235 |
| 2011/0191485 | A1 * | 8/2011 | Umbehocker ................ 709/229 |
| 2011/0299393 | A1 * | 12/2011 | Almutairi et al. ............. 370/235 |

FOREIGN PATENT DOCUMENTS

WO   WO 2012000200 A1 *  1/2012

* cited by examiner

*Primary Examiner* — Farley Abad
(74) *Attorney, Agent, or Firm* — Muirhead and Saturnelli, LLC

(57) ABSTRACT

Controlling I/O operations with a storage device includes establishing a quota that corresponds to a maximum amount of data to store on the storage device in a given amount of time, determining if processing an I/O operation would cause the quota to be exceeded, and performing the I/O operation if the quota is not exceeded. The quota may be provided in I/O operations per second or as I/O throughput. Controlling I/O operations with a storage device may also include accumulating credit in response to a rate of I/O operations being less than the quota and performing I/O operations when the quota is exceeded in response to the credit being greater than zero. The credit may be decreased if an I/O operation is performed when the quota is exceeded.

20 Claims, 7 Drawing Sheets

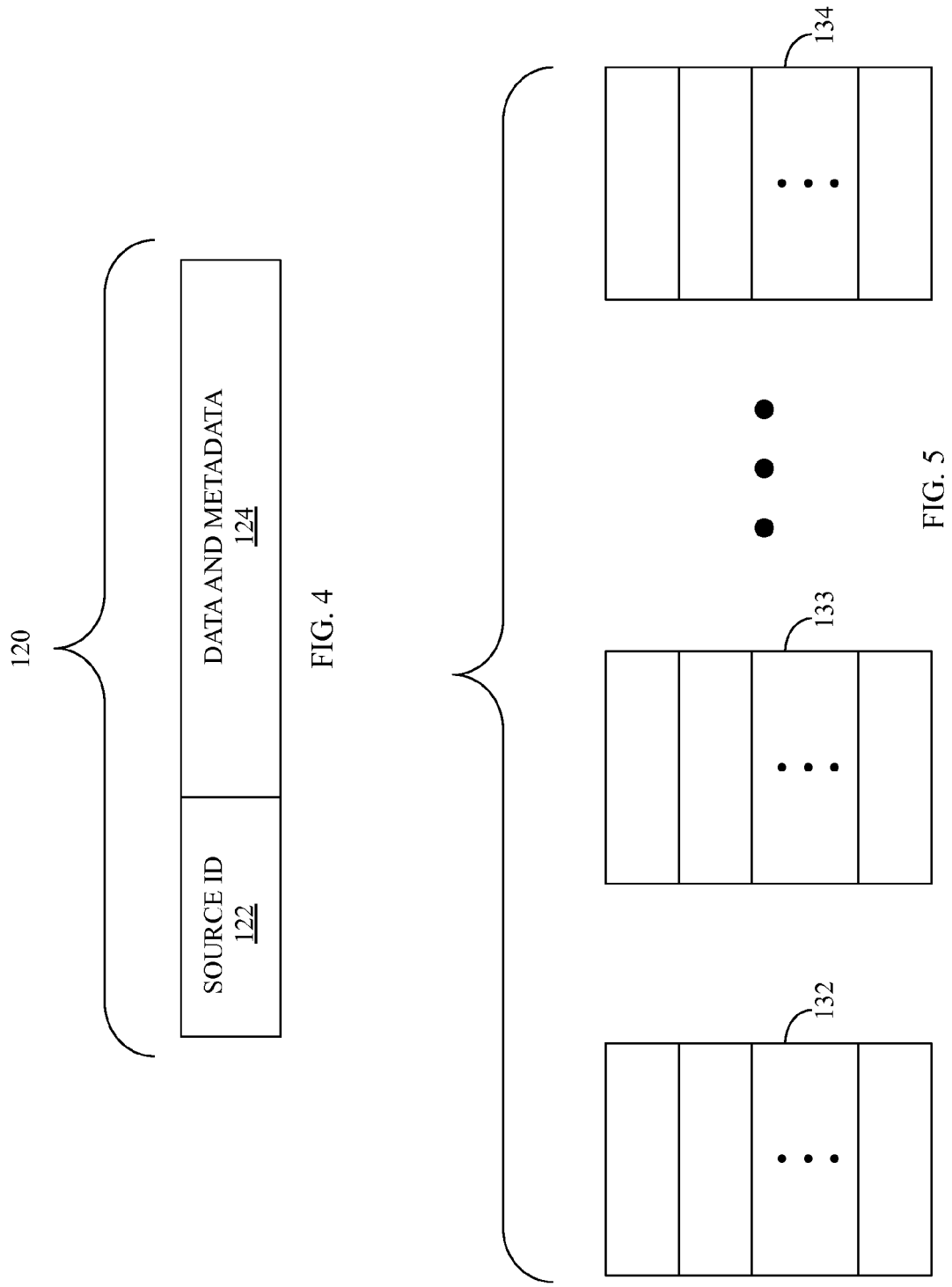

I/O PERFORMANCE QUOTAS

BACKGROUND OF THE INVENTION

1. Technical Field

This application relates to computer storage devices, and more particularly to the field of transferring data between storage devices.

2. Description of Related Art

Host processor systems may store and retrieve data using a storage device containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

In some cases, different users or groups of users that share a storage device are independent of each other. For example, different companies and/or different departments in the same company and/or different applications or groups of applications may share a storage device. When this occurs, it is often useful to be able to allocate storage device resources in a way that provides sufficient response time to all of the independent users. Such allocation may be informal or may be provided formally in a service level agreement or similar. However, providing a guaranteed level of service in an efficient manner may be difficult, especially in situations where the configuration and load levels of different users change often.

Accordingly, it is desirable to have different entities using a storage system be provided with a guaranteed level of service in an efficient and reliable manner.

SUMMARY OF THE INVENTION

According to the system described herein, controlling I/O operations with a storage device includes establishing a quota that corresponds to a maximum amount of data to store on the storage device in a given amount of time, determining if processing an I/O operation would cause the quota to be exceeded, and performing the I/O operation if the quota is not exceeded. The quota may be provided in I/O operations per second or as I/O throughput. Controlling I/O operations with a storage device may also include accumulating credit in response to a rate of I/O operations being less than the quota and performing I/O operations when the quota is exceeded in response to the credit being greater than zero. The credit may be decreased if an I/O operation is performed when the quota is exceeded. The credit may not be increased beyond a maximum value. Pending I/O operations may be provided in a queue. An alert may be provided in response to an attempt to exceed the quota. Determining if processing an I/O operation would cause the quota to be exceeded may include determining if a time of processing a previous I/O operation was recent. The quota may be provided in I/O operations per second and a previous I/O operation may be determined to be recent if a time since the previous I/O operation is less than the reciprocal of the quota.

According further to the system described herein, computer software, provided in a non-transitory computer-readable medium, controls I/O operations with a storage device. The software includes executable code that maintains an established quota that corresponds to a maximum amount of data to store on the storage device in a given amount of time, executable code that determines if processing an I/O operation would cause the quota to be exceeded, and executable code that performs the I/O operation if the quota is not exceeded. The quota may be maintained in I/O operations per second or as I/O throughput. The software may also include executable code that accumulates credit in response to a rate of I/O operations being less than the quota and executable code that performs I/O operations when the quota is exceeded in response to the credit being greater than zero. The credit may be decreased if an I/O operation is performed when the quota is exceeded. The credit may not be increased beyond a maximum value. Pending I/O operations may be provided in a queue. An alert may be provided in response to an attempt to exceed the quota. Determining if processing an I/O operation would cause the quota to be exceeded may include determining if a time of processing a previous I/O operation was recent. The quota may be provided in I/O operations per second and a previous I/O operation may be determined to be recent if a time since the previous I/O operation is less than the reciprocal of the quota.

BRIEF DESCRIPTION OF DRAWINGS

FIG. 4 is a schematic diagram showing a data packet according to an embodiment of the system described herein.

FIG. 5 is a schematic diagram showing a plurality of queues according to an embodiment of the system described herein.

DETAILED DESCRIPTION OF VARIOUS EMBODIMENTS

Figure 1:
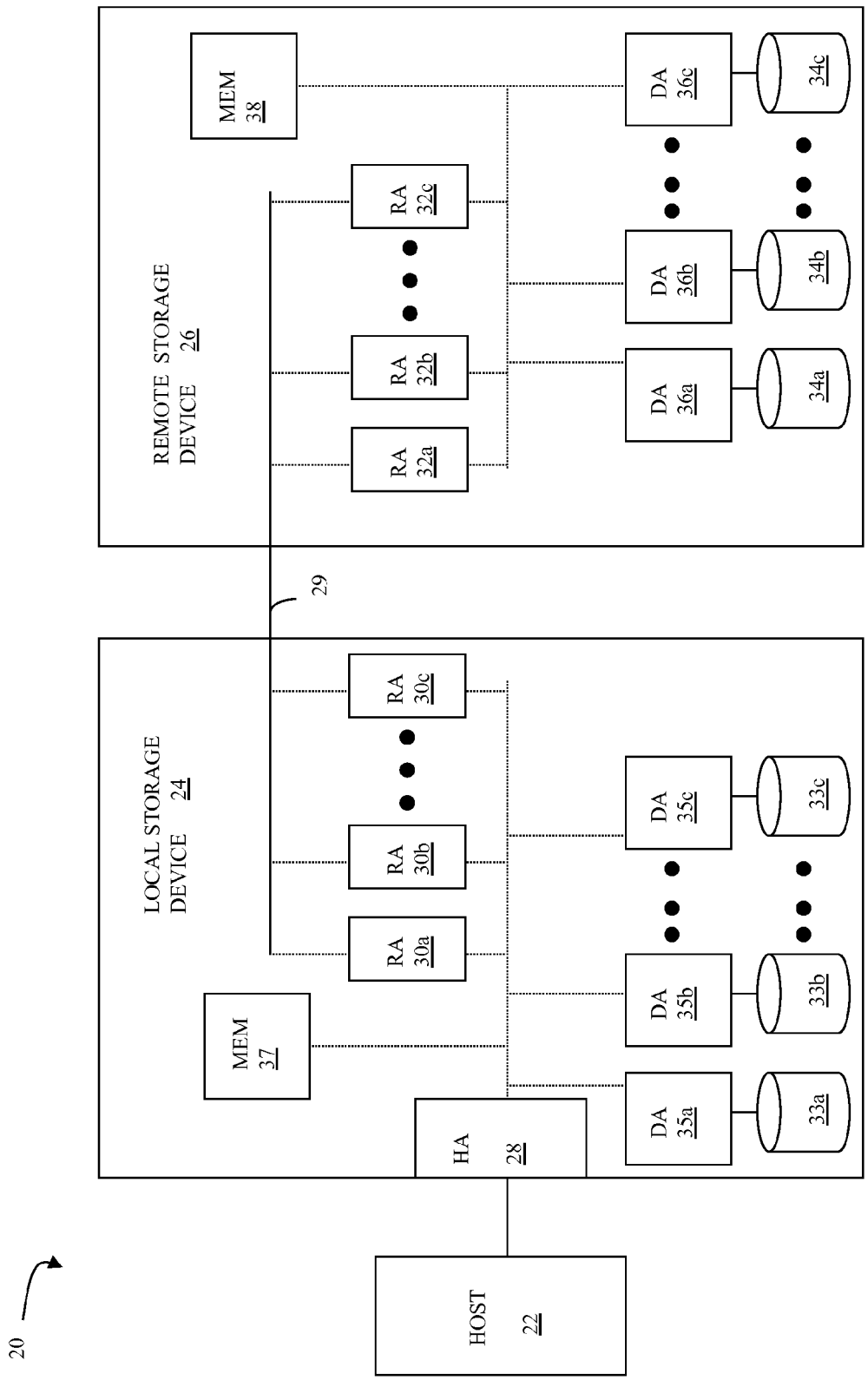
FIG. 1 is a schematic diagram showing a host, a local storage device, and a remote data storage device used in connection with an embodiment of the system described herein.

Referring to FIG. 1, a diagram 20 shows a relationship between a host 22, a local storage device 24, and a remote storage device 26. The host 22 reads and writes data from and to the local storage device 24 via a host adapter (HA) 28, which facilitates the interface between the host 22 and the local storage device 24. Although the diagram 20 only shows one host 22 and one HA 28, it will be appreciated by one of ordinary skill in the art that multiple HA's may be used and that one or more HA's may have one or more hosts coupled thereto.

Data from the local storage device 24 is copied to the remote storage device 26 via a link 29 to cause the data on the remote storage device 26 to be identical to the data on the local storage device 24. In an embodiment herein, data may be copied using a synchronous RDF protocol (SRDR/S), an asynchronous RDF protocol (SRDF/A), and data mobility (DM) copy mode, a non-ordered background copy mode. Of course, other data copy modes may also be used. Communication using synchronous RDF is described, for example, in U.S. Pat. No. 5,742,792 titled "REMOTE DATA MIRRORING" to Yanai, et al., which is incorporated by reference herein. Communication using asynchronous RDF is described, for example, in U.S. Pat. No. 7,054,883 titled "VIRTUAL ORDERED WRITES FOR MULTIPLE STORAGE DEVICES" to Meiri, et al., which is incorporated by reference herein.

Although only one link is shown (the link 29), it is possible to have additional links between the storage devices 24, 26 and to have links between one or both of the storage devices 24, 26 and other storage devices (not shown). In addition, the link 29 may be provided using a direct connection (wired, over-the-air, or some combination thereof), a network (such as the Internet), or any other appropriate means for conveying data. Note that there may be a time delay between the transfer of data from the local storage device 24 to the remote storage device 26, so that the remote storage device 26 may, at certain points in time, contain data that is not identical to the data on the local storage device 24.

The local storage device 24 includes a first plurality of RDF adapter units (RA's) 30a, 30b, 30c and the remote storage device 26 includes a second plurality of RA's 32a-32c. The RA's 30a-30c, 32a-32c are coupled to the RDF link 29 and are similar to the host adapter 28, but are used to transfer data between the storage devices 24, 26. The software used in connection with the RA's 30a-30c, 32a-32c is discussed in more detail elsewhere herein.

The storage devices 24, 26 may include one or more disks, each containing a different portion of data stored on each of the storage devices 24, 26. FIG. 1 shows the storage device 24 including a plurality of disks 33a, 33b, 33c and the storage device 26 including a plurality of disks 34a, 34b, 34c. The remote data copying functionality described herein may be applied so that the data for at least a portion of the disks 33a-33c of the local storage device 24 is copied, using RDF or a different mechanism, to at least a portion of the disks 34a-34c of the remote storage device 26. It is possible that other data of the storage devices 24, 26 is not copied between the storage devices 24, 26, and thus is not identical.

Each of the disks 33a-33c may be coupled to a corresponding disk adapter unit (DA) 35a, 35b, 35c that provides data to a corresponding one of the disks 33a-33c and receives data from a corresponding one of the disks 33a-33c. Similarly, a plurality of DA's 36a, 36b, 36c of the remote storage device 26 may be used to provide data to corresponding ones of the disks 34a-34c and receive data from corresponding ones of the disks 34a-34c. An internal data path exists between the DA's 35a-35c, the HA 28 and the RA's 30a-30c of the local storage device 24. Similarly, an internal data path exists between the DA's 36a-36c and the RA's 32a-32c of the remote storage device 26. Note that, in other embodiments, it is possible for more than one disk to be serviced by a DA and that it is possible for more than one DA to service a disk.

The local storage device 24 also includes a global memory 37 that may be used to facilitate data transferred between the DA's 35a-35c, the HA 28 and the RA's 30a-30c. The memory 37 may contain tasks that are to be performed by one or more of the DA's 35a-35c, the HA 28 and the RA's 30a-30c, and a cache for data fetched from one or more of the disks 33a-33c. Similarly, the remote storage device 26 includes a global memory 38 that may contain tasks that are to be performed by one or more of the DA's 36a-36c and the RA's 32a-32c, and a cache for data fetched from one or more of the disks 34a-34c. Use of the memories 37, 38 is described in more detail hereinafter.

The storage space in the local storage device 24 that corresponds to the disks 33a-33c may be subdivided into a plurality of volumes or logical devices. The logical devices may or may not correspond to the physical storage space of the disks 33a-33c. Thus, for example, the disk 33a may contain a plurality of logical devices or, alternatively, a single logical device could span both of the disks 33a, 33b. Similarly, the storage space for the remote storage device 26 that comprises the disks 34a-34c may be subdivided into a plurality of volumes or logical devices, where each of the logical devices may or may not correspond to one or more of the disks 34a-34c. Other physical storage elements may be used for physical storage, such as flash drives, so that the disks 34a-34c may be understood to include conventional disk drive units as well as flash memory and/or other appropriate physical storage.

Providing a mapping between portions of the local storage device 24 and the remote storage device 26 involves setting up a logical device on the remote storage device 26 that is a remote mirror for a logical device on the local storage device 24. The host 22 reads and writes data from and to the logical device on the local storage device 24 and the mapping causes modified data to be transferred from the local storage device 24 to the remote storage device 26 using the RA's, 30a-30c, 32a-32c and the link 29. In steady state operation, the logical device on the remote storage device 26 contains data that is identical to the data of the logical device on the local storage device 24. When the RDF mechanism is used, the logical device on the local storage device 24 that is accessed by the host 22 is referred to as the "R1 volume" (or just "R1") while the logical device on the remote storage device 26 that contains a copy of the data on the R1 volume is called the "R2 volume" (or just "R2"). Thus, the host reads and writes data from and to the R1 volume and RDF handles automatic copying and updating of the data from the R1 volume to the R2 volume. The system described herein may be implemented using software, hardware, and/or a combination of software and hardware where software may be stored in an appropriate storage medium and executed by one or more processors.

Figure 2:
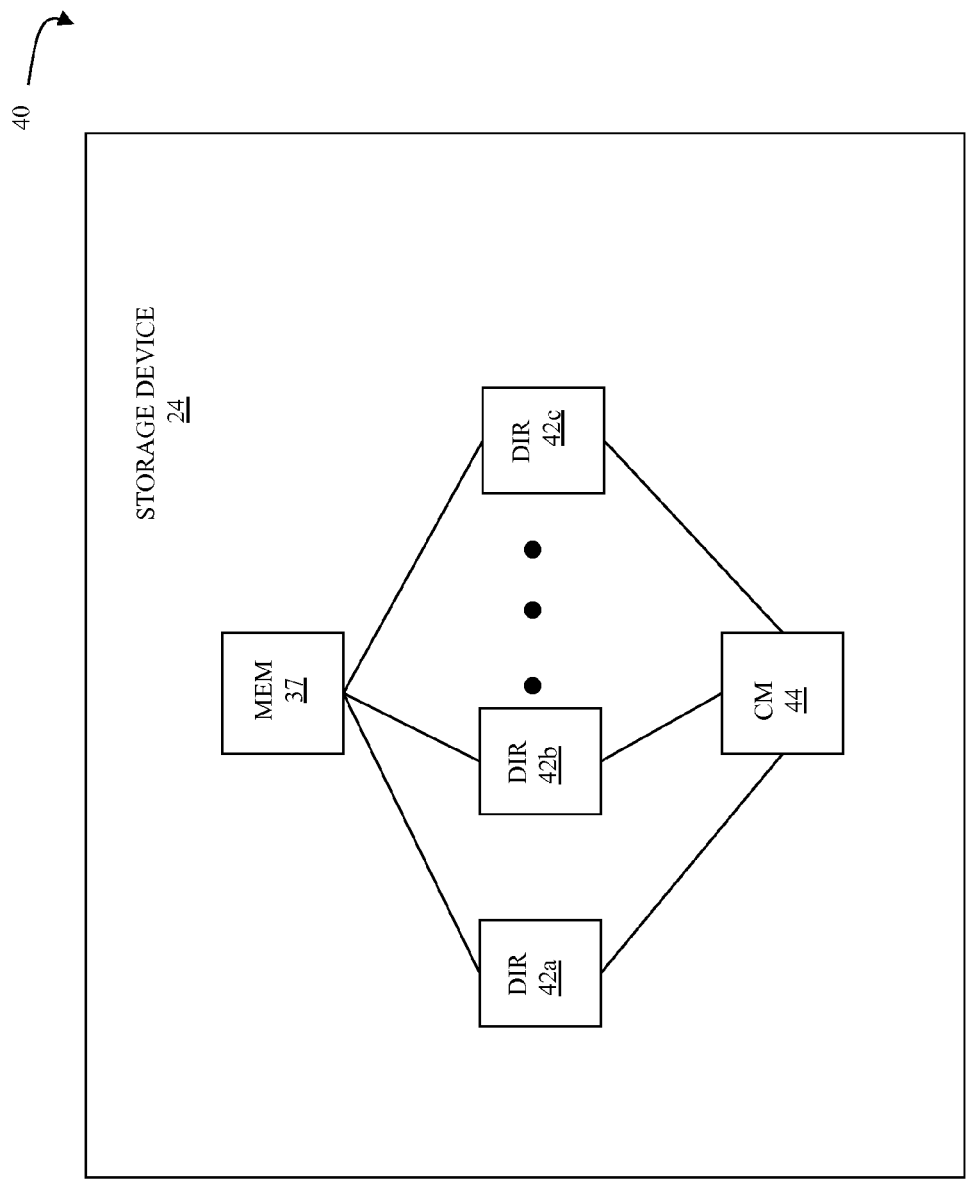
FIG. 2 is a schematic diagram showing a storage device, memory, a plurality of directors, and a communication module that may be used in connection with an embodiment of the system described herein.

Referring to FIG. 2, a diagram 40 illustrates an embodiment of the storage device 24 where each of a plurality of directors 42a-42c are coupled to the memory 37. Each of the directors 42a-42c represents the HA 28 (and/or other HA's), the RA's 30a-30c, or DA's 35a-35c. In an embodiment disclosed herein, there may be up to sixty four directors coupled to the memory 37. Of course, for other embodiments, there may be a higher or lower maximum number of directors that may be used.

The diagram 40 also shows an optional communication module (CM) 44 that provides an alternative communication path between the directors 42a-42c. Each of the directors 42a-42c may be coupled to the CM 44 so that any one of the directors 42a-42c may send a message and/or data to any other one of the directors 42a-42c without needing to go through the memory 37. The CM 44 may be implemented using conventional MUX/router technology where a sending one of the directors 42a-42c provides an appropriate address to cause a message and/or data to be received by an intended receiving one of the directors 42a-42c. Some or all of the functionality of the CM 44 may be implemented using one or more of the directors 42a-42c so that, for example, the directors 42a-42c may be interconnected directly with the interconnection functionality being provided on each of the directors 42a-42c. In addition, a sending one of the directors 42a-42c may be able to broadcast a message to all of the other directors 42a-42c at the same time.

In some embodiments, one or more of the directors 42a-42c may have multiple processor systems thereon and thus may be able to perform functions for multiple directors. In some embodiments, at least one of the directors 42a-42c having multiple processor systems thereon may simultaneously perform the functions of at least two different types of directors (e.g., an HA and a DA). Furthermore, in some embodiments, at least one of the directors 42a-42c having multiple processor systems thereon may simultaneously perform the functions of at least one type of director and perform other processing with the other processing system. In addition, all or at least part of the global memory 37 may be provided on one or more of the directors 42a-42c and shared with other ones of the directors 42a-42c.

Note that, although specific storage device configurations are disclosed in connection with FIG. 1 and FIG. 2, it should be understood that the system described herein may be implemented on any appropriate platform. Thus, the system described herein may be implemented using a platform like that described in connection with FIG. 1 and/or FIG. 2 or may be implemented using a platform that is somewhat or even completely different from any particular platform described herein.

Figure 3:
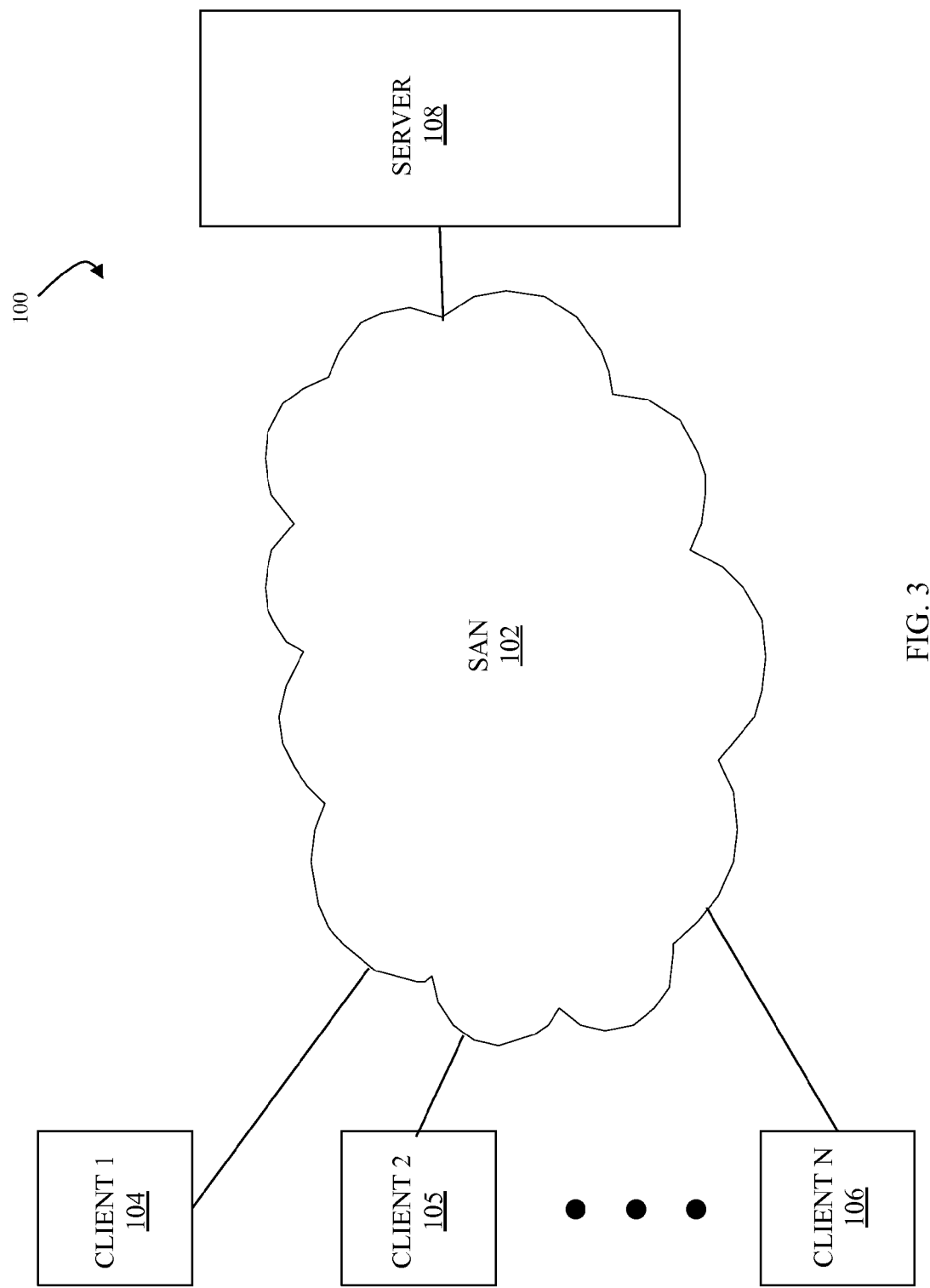
FIG. 3 is a schematic diagram showing a plurality of client devices coupled to a storage device through a storage area network (SAN) according to an embodiment of the system described herein.

Referring to FIG. 3, a diagram 100 shows a SAN 102 that is used to couple a plurality of clients 104-106 to a storage device 108. The clients 104-106 may perform I/O operations with the storage device 108 to store data thereon and receive stored data therefrom and may be host computers like the host 22 discussed above. The storage device 108 may be like the storage devices 24, 26 discussed above. The storage device 108 may have a number of ports (connections) thereon for coupling the storage device 108 to the SAN 102. Thus, the clients 104-106 access the storage device 108 through the SAN 102 via the ports on the storage device 108. The system described herein allocates an amount of access (quota) provided to the ports (or other asset of the storage device 108) for the clients 104-106 according to a predetermined classification, such as by storage groups, subsets of the clients 104-106, application(s) running on the clients 104-106, application priority, etc. In an embodiment herein, a storage group may correspond to a subset of logical volumes that are grouped together, such as a group of logical volumes used for a single application. The quota may be measured in I/O operations per second (IOPS) or in throughput (e.g., megabytes per second) or using any other appropriate metric. For the discussion herein, IOPS will be used for illustration purposes, but it should be understood that throughput or some other appropriate measure may be used instead.

Referring to FIG. 4, a packet 120 is shown as including a source ID field 122 and a data/metadata field 124. The packet 120 is provided to the storage device 108 by one of the clients 104-106 in connection with I/O requests to the storage device 108. The packet 120 may be in any appropriate format that can be used by the storage device 108. Similarly, the data/metadata 124 may be in any appropriate format. The source ID 122 indicates a source of the data such as one of the clients 104-106, a particular storage group, a particular application, etc. depending on the classification used to allocate access to the ports of the storage device 108. For example, if the ports on the storage device 108 are allocated according to storage group where each storage group is allowed a maximum number of IOPS for a specific port or set of ports, then the source ID field 122 may indicate the particular storage group associated with the packet 120. Use of the source id field 122 to establish quotas for the ports is discussed in more detail elsewhere herein.

Referring to FIG. 5, a plurality of I/O queues 132-134 are provided within the storage device 108 to handle I/O requests (i.e., reads and writes) to the storage device 108 by the clients 104-106. Each of the queues 132-134 has a plurality of entries where each of the entries corresponds to a packet received at the storage device 108. Each of the queues 132-134 may contain packets for each of a different source ID for each received packet. Thus, the queue 132 may represent data packets having a first source ID, the queue 133 may represent data packets having a second, different, source ID, and the queue 134 may represent data packets having a third, different, source ID. As discussed in more detail elsewhere herein, the storage device 108 may process each of the queues 132-134 according to values provided for quotas for the ports (or other asset(s) of the storage device 108).

Figure 6:
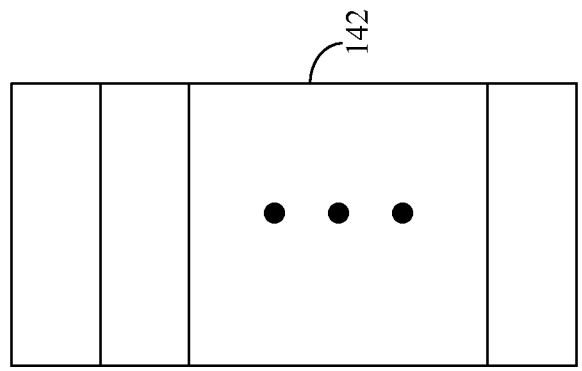
FIG. 6 is a schematic diagram showing a single queue according to an embodiment of the system described herein.

Referring to FIG. 6, a single queue 142 may be used to handle all of the I/O requests by the clients 104-106 to the storage device 108. Each of the entries in the queues 142 may correspond to a received data packet. However, in the case of the single queue 142, each of the entries may include source ID information so that the processing described herein, which allocates port access based on source ID, may be applied to the elements in the queue 142.

Figure 7:
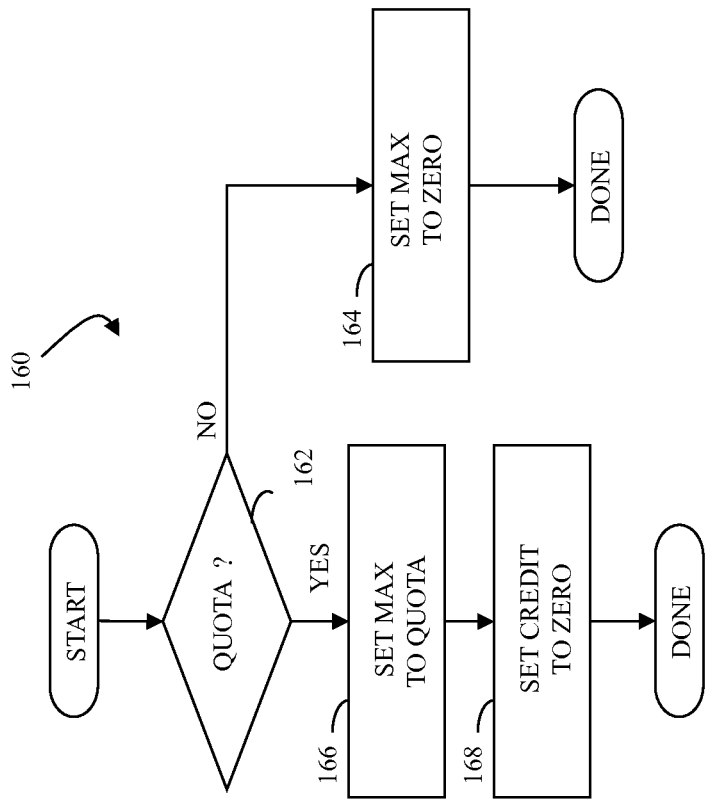
FIG. 7 is a flow diagram illustrating initializing for a new storage group according to an embodiment of the system described herein.

Referring to FIG. 7, a flow chart 160 illustrates processing performed in connection with initializing processing for adding a new storage group that is to be associated with I/O operations for the storage device 108. As discussed elsewhere herein, criteria (classification) other than storage group may be used to allocate assets (e.g., ports) of the storage device 108. However, for illustration purposes, the system is described herein as enforcing IOPS quotas for ports of the storage device 108 according to storage groups. Once processing is initialized for a new storage group, then any I/O operations received at the storage device 108 for that storage group are handled properly, as discussed in more detail elsewhere herein.

Processing begins at a first test step 162 where it is determined whether a quota has been set for the storage group being added. In some embodiments, it is possible to set a quota for some of the storage groups and not set a quota for other ones of the storage groups. If it is determined at the step 162 that no quota has been set, then control transfers from the step 162 to a step 164 where the value of MAX, which is used in the processing described herein, is set to zero. As discussed elsewhere herein, a value of zero for MAX for a storage group causes no quota to be imposed on the storage group. Following the step 164, processing is complete.

If it is determined at the test step 162 that a quota has been specified, then control transfers from the step 162 to a step 166 where the value of MAX is set to the quota. MAX represents a maximum number for IOPS that can be processed according to the quota. Following the step 166 is a step 168 where CREDIT is set to zero. The value CREDIT represents an amount of additional IOPS allowed based on data for a particular storage group having previously been provided at less than a rate specified by the quota. Use of the CREDIT value is described in more detail elsewhere herein. Following the step 168, processing is complete.

Figure 8:
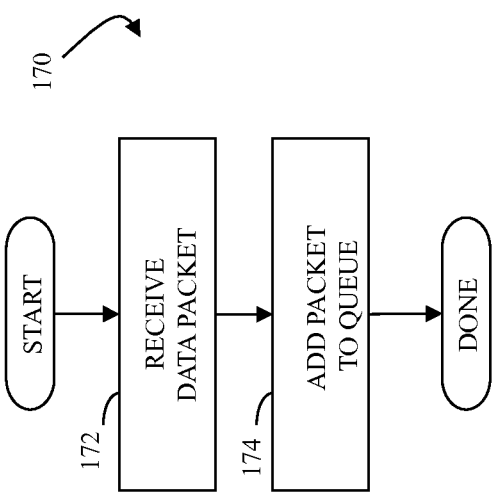
FIG. 8 is a flow diagram illustrating a storage device receiving an I/O request from a client according to an embodiment of the system described herein.

Referring to FIG. 8, a flow diagram 170 illustrates processing performed in connection with the storage device 108 receiving a data I/O request (e.g., a read request or a write request) from one of the clients 104-106. Processing begins at a first step 172 where the storage device 108 receives a data packet. Following the step 172, control transfers to a step 174 where the data packet is added to a queue. As discussed elsewhere herein, in some cases, data is added to a specific queue according to the criteria for imposing quotas. For example, quotas may be imposed according to storage group, and there may be a specific queue for each storage group. As discussed elsewhere herein, there may be a single queue for all of the received data. Following the step 174, processing is complete.

Figure 9:
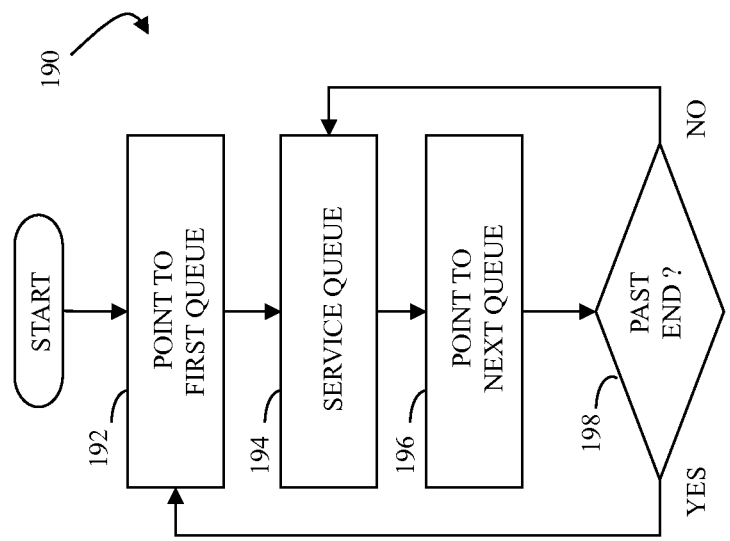
FIG. 9 is a flow diagram illustrating handling a plurality of I/O queues at a storage device according to an embodiment of the system described herein.

Referring to FIG. 9, a flow diagram 190 illustrates processing performed in connection with the storage device 108 handling I/O operations for received data that has been stored in the queue(s). Note that the processing illustrated by the flow diagram 190 may be adapted in a straight-forward matter to embodiments that use a single queue by selectively processing queue elements according to the source ID of each of the elements.

Processing begins at a first step 192 where an iteration pointer used for processing herein is set to point to the first queue. Following the step 192 is a step 194 where the queue is serviced. Servicing the queue at the step 194 is discussed in more detail elsewhere herein. Note, however, for the embodiment disclosed herein, the queue may be serviced even if the queue is empty. In other embodiments, the queue may only be serviced in response to a corresponding I/O operation therefor. Following the step 194 is a step 196 where the iteration pointer is incremented. Following the step 196 is a test step 198 where it is determined if the iteration pointer points past the end of the list of queues (i.e., if all of the queues have been serviced). If so, then control transfers back to the step 192, discussed above, where the iteration pointer is reset to point to the first queue. Otherwise, control transfers back to the step 194, discussed above, where the queue indicated by the iteration pointer is serviced.

Figure 10:
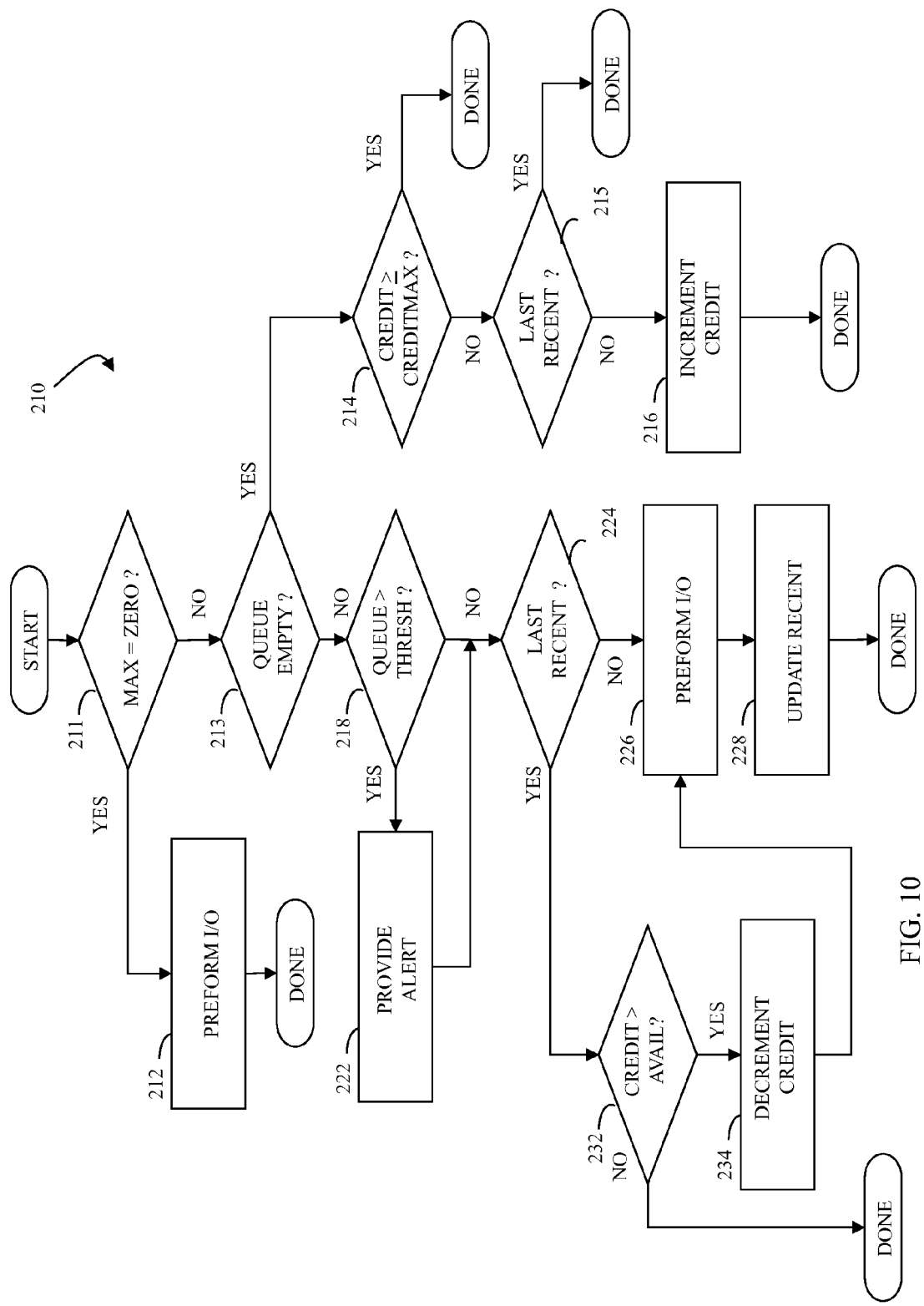
FIG. 10 is a flow diagram illustrating servicing an I/O queue at a storage device according to an embodiment of the system described herein.

Referring to FIG. 10, a flow diagram 210 illustrates in more detail processing performed at the step 194, discussed above, where the I/O queue indicated by the iteration pointer is serviced. Processing begins at a first test step 211 where it is determined if the value of MAX equals zero, indicating that no quota is being imposed for the particular queue being serviced. If so, then control transfers from the test step 211 to a step 212 where the next I/O operation in the queue (if any) is performed. Following the step 212, processing is complete. If it is determined at the test step 211 that the value of MAX is not zero, then control transfers from the test step 211 to a test step 213 where it is determined if the queue is empty. If so, then control transfers from the test step 213 to a test step 214 where it is determined if the CREDIT value is greater than or equal to a maximum allowed value of credit.

The CREDIT value is used to allow additional I/Os when the instantaneous rate of IOPS corresponds to the quota and a recent prior instantaneous rate of IOPS was less than the quota. For example, if the quota is one hundred I/O operations per second, and the queue has been using less than the maximum allowed IOPS (or similar) for some time, then the accumulated credit allows the system to subsequently exceed one hundred I/O operations per second for an amount of time until the credit has been used. In an embodiment herein, the CREDIT value is not allowed to exceed a maximum amount. In an embodiment herein, the maximum amount is set to one half of the quota so that, for example, if the quota is one hundred I/Os per second, the maximum value for the credit is five. Of course, a user may set a maximum value for credit to any appropriate value.

If it is determined at the test step 214 that the CREDIT value is greater than or equal to the maximum allowed credit value, then processing is complete. Otherwise, control transfers from the test step 214 to a test step 215 where it is determined if the last I/O operation for the queue being serviced occurred recently. In an embodiment herein, the test at the step 215 determines if the last I/O operation occurred sooner than the inverse of the quota (the value of MAX) in time. Thus, for example, if the quota is two hundred I/O operations per second, then the test at the step 215 determines the previous I/O operation occurred within the last five milliseconds (one divided by two hundred–the reciprocal of the quota). If it is determined at the test step 215 that a previous I/O operation was recent, then processing is complete. Otherwise, control transfers from the test step 215 to a step 216 where the CREDIT value is incremented by an amount corresponding to an amount of quota that would have been used had there been an I/O operation. Following the step 216, processing is complete. In some embodiments, it may be possible to also provide a mechanism for decreasing the value of CREDIT if the credit is unused for a certain amount of time.

If it is determined at the test step 213 that the queue is not empty, then control transfers from the test step 213 to a test step 218 where it is determined if the number of elements in the queue exceed a predetermined threshold. The test at the step 218 determines if the quota is too low for the rate at which data is being provided by the clients 104-106 (i.e., if the actual data rate is attempting to exceed the threshold). For example, if the clients are providing data at an average rate of two hundred I/Os per second, but the quota is only one hundred I/Os per second, then the number of elements in the queue may become too large and exceed the threshold. If it determined at the test step 218 that the number of elements exceeds the threshold, then control transfers from the test step 218 to a step 222 where an alert is provided, for example, by sending a message to an administrative user or to a process that is I/O requests to the queue.

Following the step 222 or following the step 218 if the queue does not exceed the threshold is a test step 224 where it is determined if the last I/O operation for the queue being serviced occurred recently. The test at the step 224 is similar to the test at the step 215, described above. If it is determined at the test step 224 that a previous I/O operation was not recent, then control transfers from the test step 224 to a step 226 where an I/O operation (i.e., a read or write to the storage device 108) for an entry in the queue being processed is performed. In an embodiment herein, the queue is a first in, first out queue so that the operation performed at the step 226 is for the oldest entry in the queue. Following the step 226 is a step 228 where an indicator of the most recent time of a previous I/O operation is updated to correspond to the I/O operation performed at the step 226. Following the step 228, processing is complete.

If it is determined at the step 224 that a previous I/O operation occurred recently, then control transfers from the test step 224 to a test step 232 where it is determined if there is any credit available (i.e., if the CREDIT values does not equal zero). If not, then processing is complete. Otherwise, control transfers from the test step 232 to a step 234 where a value for credit is decremented to reflect using the credit.

Following the step 234, control transfers to the step 226, discussed above, where an I/O operation is performed.

In alternative embodiments, it may be possible to perform processing like that illustrated in FIG. 10 only in response to an I/O being received by the storage device 108. In that case, the system would first test if there is any unused quota available and perform the I/O operation if so. If there is no unused I/O quota available, then the system could determine if there is any unused credit available and perform the I/O operation if there is. The system may calculate I/O and credit when an I/O is received and may sleep if there are pending I/O operations that cannot be processed immediately because of insufficient quota and credits.

Various embodiments discussed herein may be combined with each other in appropriate combinations in connection with the system described herein. The system described herein may be implemented using the hardware described herein, variations thereof, or any other appropriate hardware capable of providing the functionality described herein. Thus, for example, one or more storage devices having components as described herein may, alone or in combination with other devices, provide an appropriate platform that executes any of the steps described herein.

In some instances, the order of steps in the flowcharts, flow diagrams and/or described flow processing may be modified, where appropriate. Further, various aspects of the system described herein may be implemented using software, hardware, a combination of software and hardware and/or other modules or devices having the described features and performing the described functions. Software implementations of the system described herein may include executable code that is provided in a non-volatile computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

While the invention has been disclosed in connection with various embodiments, modifications thereon will be readily apparent to those skilled in the art. Accordingly, the spirit and scope of the invention is set forth in the following claims.

What is claimed is:

1. A method of controlling I/O operations with a storage device, comprising:
    establishing a plurality of quotas that each correspond to a maximum amount of data to store on the storage device in a given amount of time, wherein each of the quotas are respectively imposed according to each of a plurality of storage groups, each of the storage groups being a group of logical volumes accessing the storage device via ports of the storage device, and wherein each of the quotas is set and enforced independently for each of the storage groups using the ports of the storage device;
    in connection with an I/O operation, determining a particular storage group of the plurality of storage groups with which the I/O operation is associated;
    determining if processing the I/O operation would cause a particular quota of the plurality of quotas to be exceeded, the particular quota corresponding to the particular storage group with which the I/O operation is associated; and
    performing the I/O operation for the particular storage group if the particular quota is not exceeded.

2. The method according to claim 1, wherein each of the quotas is provided in I/O operations per second.

3. The method according to claim 1, wherein each of the quotas is provided as I/O throughput.

4. The method according to claim 1, further comprising:
    accumulating credit for the particular storage group in response to a rate of I/O operations being less than the particular quota; and
    performing I/O operations when the particular quota is exceeded in response to the credit being greater than zero.

5. The method according to claim 4, wherein the credit is decreased if an I/O operation is performed when the particular quota is exceeded.

6. The method according to claim 4, wherein the credit is not increased beyond a maximum value.

7. The method according to claim 1, wherein pending I/O operations are provided in a queue.

8. The method according to claim 7, wherein an alert is provided in response to an attempt to exceed any of the quotas.

9. The method according to claim 1, wherein determining if processing the I/O operation would cause the particular quota to be exceeded includes determining if a time of processing a previous I/O operation was recent.

10. The method according to claim 9, wherein the particular quota is provided in I/O operations per second and wherein the previous I/O operation is determined to be recent if a time since the previous I/O operation is less than the reciprocal of the particular quota.

11. A non-transitory computer-readable medium storing software that, when executed by a computer, controls I/O operations with a storage device, the software comprising:
    executable code that maintains an established plurality of quotas that correspond to a maximum amount of data to store on the storage device in a given amount of time, wherein each of the quotas are respectively imposed according to each of a plurality of storage groups, each of the storage groups being a group of logical volumes accessing the storage device via ports of the storage device, and wherein each of the quotas is set and enforced independently for each of the storage groups using the ports of the storage device;
    executable code that, in connection with an I/O operation, determines a particular storage group of the plurality of storage groups with which the I/O operation is associated;
    executable code that determines if processing the I/O operation would cause a particular quota of the plurality of quotas to be exceeded, the particular quota corresponding to the particular storage group with which the I/O operation is associated; and
    executable code that performs the I/O operation for the particular storage group if the particular quota is not exceeded.

12. The non-transitory computer-readable medium according to claim 11, wherein each of the quotas is maintained in I/O operations per second.

13. The non-transitory computer-readable medium according to claim 11, wherein each of the quotas is maintained as I/O throughput.

14. The non-transitory computer-readable medium according to claim 11, further comprising:

executable code that accumulates credit for the particular storage group in response to a rate of I/O operations being less than the particular quota; and executable code that performs I/O operations when the particular quota is exceeded in response to the credit being greater than zero.

15. The non-transitory computer-readable medium according to claim 14, wherein the credit is decreased if an I/O operation is performed when the particular quota is exceeded.

16. The non-transitory computer-readable medium according to claim 14, wherein the credit is not increased beyond a maximum value.

17. The non-transitory computer-readable medium according to claim 11, wherein pending I/O operations are provided in a queue.

18. The non-transitory computer-readable medium according to claim 17, wherein an alert is provided in response to an attempt to exceed the particular quota.

19. The non-transitory computer-readable medium according to claim 11, wherein determining if processing the I/O operation would cause the particular quota to be exceeded includes determining if a time of processing a previous I/O operation was recent.

20. The non-transitory computer-readable medium according to claim 19, wherein the particular quota is provided in I/O operations per second and wherein the previous I/O operation is determined to be recent if a time since the previous I/O operation is less than the reciprocal of the particular quota.

\* \* \* \* \*